United States Patent [19]
Jayne

[11] 3,862,779
[45] Jan. 28, 1975

[54] VEHICLE WHEEL
[76] Inventor: William Weir Jayne, 1609 E. Balboa Blvd., Arlington Heights, Ill. 92662
[22] Filed: May 1, 1973
[21] Appl. No.: 356,077

[52] U.S. Cl..... 301/63 DD, 301/63 PW, 301/64 SH
[51] Int. Cl................................................. B60b 5/02
[58] Field of Search...... 301/63 PW, 63 DD, 63 DS, 301/63 DT, 64 R, 64 SH, 72, 95, 98, 104, 65, 79, 97

[56] References Cited
UNITED STATES PATENTS

| 12,897 | 5/1855 | Clark | 301/79 |
|---|---|---|---|
| 3,064,702 | 11/1962 | Coolidge | 301/63 DS |
| 3,582,141 | 6/1971 | Kelsey | 301/65 |
| 3,669,501 | 6/1972 | Derleth | 301/63 R |
| 3,695,728 | 10/1972 | Haussels | 301/63 DD |

FOREIGN PATENTS OR APPLICATIONS

| 1,322,188 | 2/1963 | France | 301/63 DS |
| 15,560 | 2/1912 | Great Britain | 301/63 DS |
| 1,196,978 | 4/1960 | Germany | 301/97 |
| 447,695 | 11/1912 | France | 301/64 R |
| 885,675 | 8/1959 | Great Britain | 301/63 PW |

Primary Examiner—M. Henson Wood, Jr.
Assistant Examiner—Reinhard J. Eisenzopf
Attorney, Agent, or Firm—Alter, Weiss, Whitesel & Laff

[57] ABSTRACT

A vehicle wheel comprising a one-piece or two-piece structure with several alternative construction details which are selected according to the user's needs. The two-piece structure is divided in essentially equal portions along a vertical axis of the wheel. Among other things, the spoke shape may be stressed for different types of loading, and truss structure may be added for special loading. Structural member cross-sectional design and material may also vary with design parameters.

13 Claims, 19 Drawing Figures

PATENTED JAN 28 1975 3,862,779

VEHICLE WHEEL

BACKGROUND OF THE INVENTION

This invention relates to wheels and, more particularly to wheels for bicycles, motorcycles or other wheeled vehicles.

Bicycle, motorcycle and similar wheels are relatively expensive items, as compared to other parts of the vehicle. There are a number of reasons for this expense, such as the need in bicycles for great rigidity at extremely light weights. As a result, a bicycle or motorcycle wheel is an item which is primarily assembled by hand. Then, after the assembly is complete, the wheel has to be trued by tightening the loosening spokes. Heretofore, efforts to avoid the usual expense in making wheels of this kind have not been successful. For example, wheels made of solid steel or plastic disks have been tried, but are too heavy or are otherwise unsuitable. Spokes which may be attached to the rim by a machine are too heavy, lack adjustability, and otherwise fail to be satisfactory.

Hence, there is a need for a vehicle type wheel which is at least as light and strong as presently available wheels, and which may be made at very low cost, preferably with no need for truing, after the manufacture is complete.

Another problem that exists with vehicle wheels of this kind, particularly bicycle and motorcycle wheels, is the difficulty of maintenance. The wheels frequently require realignment which is a time-consuming and costly operation.

Accordingly, an object of this invention is to provide new and improved vehicle wheels which are at least as light, if not lighter, and as strong as existing wheels of this kind. It is a further object to provide wheels which can be made with great accuracy and precision, and yet at a relatively low cost. In this connection, an object is to make a molded plastic bicycle-type wheel wherein extreme accuracy may be obtained from the accuracy of molding dies. It is still another object to provide a wheel which can be easily and inexpensively maintained. A further object is to provide wheels of a basic design having a wide range of use and yet having great flexibility of adaptation. Further objects will become manifest from the following description, the drawings and the claims.

SUMMARY OF THE INVENTION

The wheel of this invention may have any of several alternative construction details which may vary according to the user's needs. Among other things, the spoke shape may be stressed for different types of loading, and truss structure may be added for special loading. Structural member cross-sectional design and material of the spoke, rim and hub may also vary with design parameters. The wheel may comprise a one-piece plastic molded structure or a two-piece structure made from plastic, metal or suitable wood-base material. The wheel would be capable of receiving a pneumatic tire. The two-piece structure would preferably consist of two essentially equal portions of the wheel divided along the central vertical axis thereof. These portions would be bolted or otherwise fastened together to form the wheel. The fastening means would be such that the portions may be readily divided for purposes of maintenance.

DESCRIPTION OF THE DRAWINGS.

FIG. 17 is a cross-section taken along line 17—17 of FIG. 7, and FIG. 18 is a cross-section taken along line 18—18 of FIG. 8.

DESCRIPTION OF THE PREFERRED EMBODIMENTS

Figure 1:
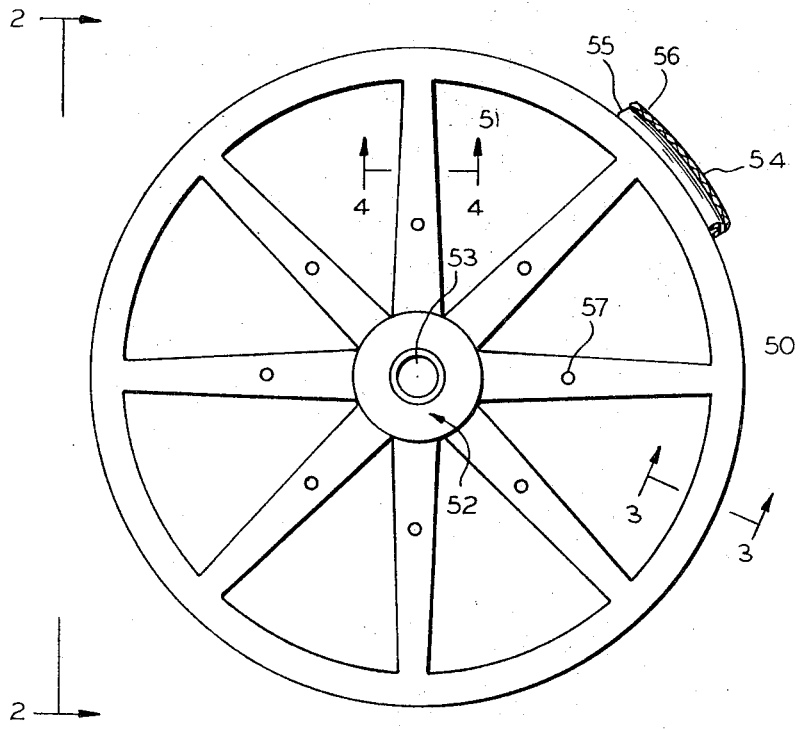
FIG. 1 is a plan view of a wheel incorporating the invention with a fragment showing how a tire may be mounted thereon.
Figure 2:
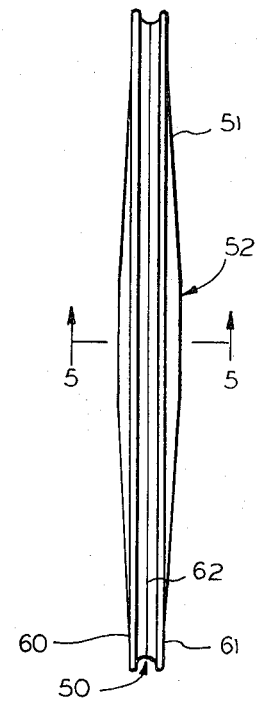
FIG. 2 is an edge view of the wheel looking in the direction 2—2.

FIGS. 1 and 2 show a wheel comprising a rim 50, a plurality of spokes 51, a wheel center section 52 and a hub area 53. This wheel may be constructed of plastic, metal, or other suitable material, or a combination of these materials. A fragment of a tire 54 is shown on the rim in FIG. 1. The tire may include the usual tread 55 and side walls 56. Either tubeless or tube tires may be used in the usual manner, or any other suitable tire structure may be used in conjunction with the wheel.

The wheel of FIGS. 1 and 2 may be made in any of many different ways. It may be molded as a single unit. Or, it may comprise a number of discrete units, such as wheel ecnter, spokes, and rim which are bolted together. To lighten the wheel, any suitable number of cutouts, holes, or openings may be formed in areas where material is not essential for strength. In a preferred embodiment, the wheel is fabricated from two essentially equal portions 60, 61 (see FIG. 2), divided along the vertical axis of the wheel. Each portion has the side appearance shown in FIG. 1. The two halves 60, 61 are brought together and fastened in face-to-face contact along line 62 by means 57, which may be bolts or other suitable fasteners. If desired, the fasteners may be omitted and the halves could be cemented together. Where the wheel is made from two portions, as shown in FIGS. 1 and 2, it can be stamped or die cut from metal or plastic or molded or cast from these materials.

Preferably, where molds are used for making the wheel, they are made with great precision, and any jig for holding the two halves 60, 61 during a fastening operation is also very precise. Hence, by a simple molding, matching, and cementing process, the wheel may be made with great precision and with a trueness surpassing even the best of the conventional bicycle, motorcycle or other vehicle wheels.

Figure 3:
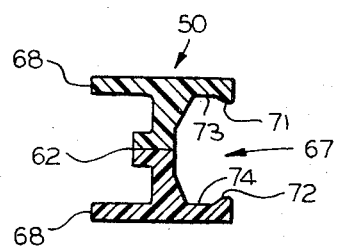
FIG. 3 is a cross-section of the rim taken at line 3—3 in FIG. 1.

The rim 50 preferably has a generally H-shaped cross-section (FIG. 3) providing a tire seat 67 on one side and strengthening flanges 68 on the other side. The tire seat comprises two opposed beads 71, 72 forming coves or relieved areas 73, 74 for receiving the bead of the tire. In the embodiment of FIG. 3, the flanges 68 have no other associated reinforcing material. However, as will become more apparent, the space between flanges 68 may also be filled or bridged by any suitable reinforcing means, such as plastic, foam, honeycomb or metal.

Figure 4:
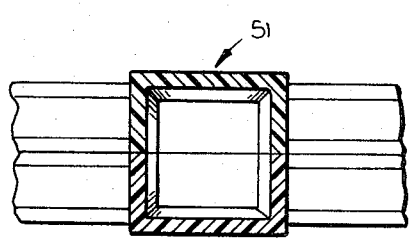
FIG. 4 is a cross-section of a spoke taken at line 4—4 in FIG. 1.

The spokes 51 (FIG. 4) may take any one of a number of different configurations. Here, the spokes are shown as longitudinally tapered members, having square cross-sections. It will be understood that other suitable cross-sectional shapes, such as oval (FIG. 17) may be used for the spokes. No reinforcing material is shown in FIG. 4, but any suitable material could fill the interior of the spoke, as usage requires or makes desirable.

Figure 5:
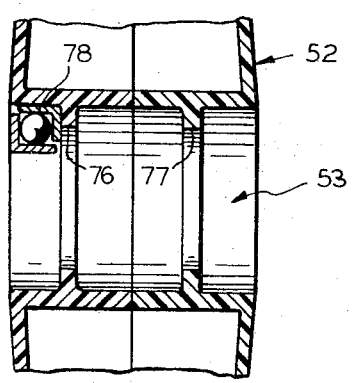
FIG. 5 is a cross-section of one hub embodiment taken along line 5—5 of FIG. 2.
Figure 6:
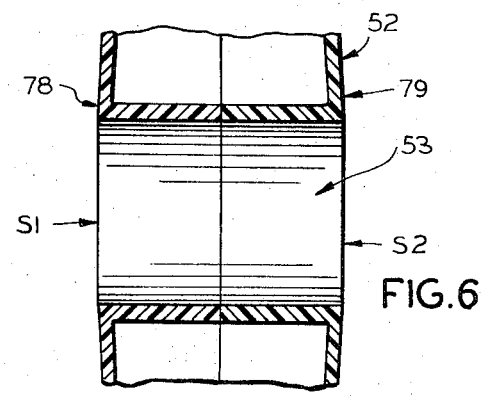
FIG. 6 is a cross-section of a second hub embodiment also taken along line 5—5 of FIG. 2.

The wheel center and hub area 52 may have either of the forms shown in FIGS. 5 or 6. In FIG. 5, the hub area 53 has two axially displaced, spaced parallel annular seats 76, 77 integrally formed therein. A ball bearing or taper bearing race 78 may be seated against each of the annular seats to support cones on the associated vehicle axle. Accordingly, this wheel center construction follows a conventional vehicle design for accommodating such bearing and support structures.

In the embodiment of FIG. 6, the hub area 53 is in the form of a simple tubular opening which is shaped and dimensioned to receive a machined metal or plastic sleeve, bearing, and axle assembly, not shown. The sleeve part of the assembly may have flanges for resting against the spaced parallel flat surfaces 78 and 79 on either side of the wheel center 52, although this construction is not always necessary. Any suitable fastening means, such as, for example, screws, bolts, rivets, glue, or welds may be used to secure the bearing sleeve in place in the wheel hub area 53. Alternatively, the wheel center 52 may be molded in a manner which secures the sleeve and bearing assembly in hub 53. For example, there could be either mating flutes or ribs inside the hub 53 and on the sleeve for the sleeve to slide into the hub 53. Or, mating screw threads could be provided in the hub and sleeve so that it may be turned therein.

Figure 7:
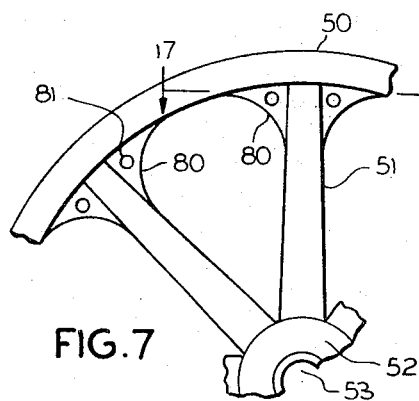
FIGS. 7–9 show several alternative embodiments of the wheels having a variety of struts and stressed construction members.
Figure 8:
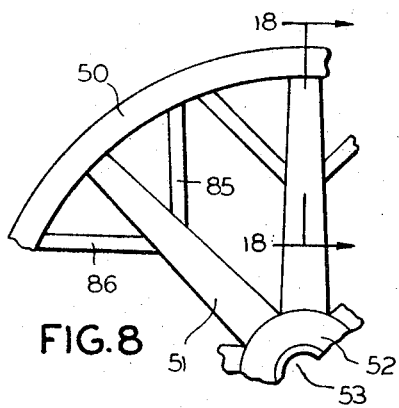
Figure 9:
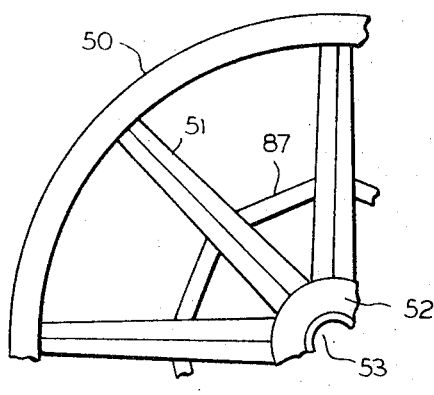

FIGS. 7-9 show alternative means for strengthening and stressing the wheel. These modifications may find the greatest utility under certain conditions of high stress, as may be encountered when the wheels are used on motorcycles, sports cars, sulkies or the like.

FIG. 7 shows arched fillets 80 which integrally join the edge 50a of the rim 50 with each spoke 51. This particular embodiment has the greatest utility when the nature of the wheel loading places the maximum stresses upon the rim 50. Here again, holes, cutouts, or openings 81 may be formed in those portions of the fillets 80 where material is not required for strength of structure. In these lightening holes 81, as well as the lightening holes which may be formed in the wheel portions 60, 61 (see FIG. 2), fastening means may be inserted to connect the two portions 60, 61 of the divided wheel embodiment of this invention.

In FIG. 8, a web of trusses or struts 85, 86 are extended between the spokes 51 and the rim 50. Here, the trusses or struts 85, 86 are shown in a Y configuration. However, it should be understood that any suitable truss or strut configuration may be used according to well-known engineering principles.

In FIG. 9, the wheel is shown with the trusses or struts 87 extending between adjacent spokes. Again, this particular disclosure is presented to illustrate the inter-spoke support. However, other forms of the inter-spoke truss work may also be provided.

Figure 10:
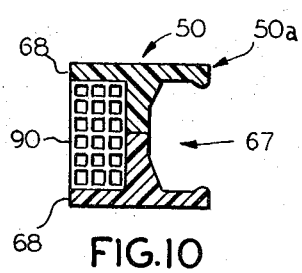
FIGS. 10–19 show alternative cross-sections of the rim, spoke, and strut structures in FIG. 1.
Figure 11:
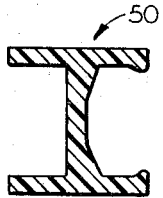
Figure 12:
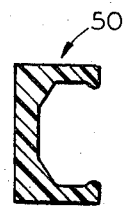

FIGS. 10-19 show details of various ways in which the plastic wheel members may be supported or reinforced. In greater detail, FIG. 10 shows a cross-section of the rim 50 structure of FIG. 3. Here, the space between reinforcing flanges 68 is filled with a foam or a honeycomb material 90 which adds strength and stability. The technology involved is somewhat similar to that used in aircraft, spacecraft and boat construction. In FIGS. 11 and 12, the rim is made in a solid one-piece construction which is particularly attractive and useful. These one-piece rim structures may be made from high impact plastic. Also, other suitable materials may be used, such as stainless steel, aluminum, magnesium, wood-based compounds, or other suitable materials.

Figure 13:
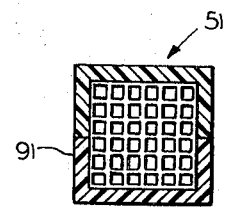

FIGS. 13-16 show alternative spoke, truss, or strut cross-sections. In FIG. 13, the spoke support shown as a solid outside shell 91 filled with foam or a honeycomb material.

Figure 14:
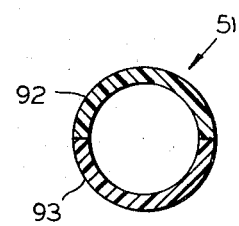
Figure 15:
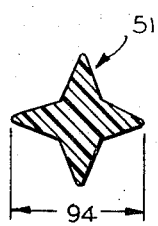
Figure 16:
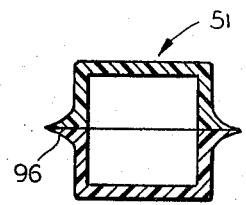

In FIG. 14, the spoke or spoke support shown is made of two semi-circular halves 92, 93, which may be cemented or otherwise put together to form a circular cross-section for the members. In FIG. 15, the spoke, truss, or strut has a solid, somewhat star-shaped cross-section. The wide dimension 94 is placed in the plane of maximum stress. In FIG. 16, the spoke 51 is molded with a flange 96 which tends to provide a higher degree of strength in one plane. Here again, the plane is selected to coincide with the plane of maximum stress for the wheel. Also, the wide area at the face of the flange 96 enables a greater area of contact when the parts are fastened or formed together.

Figure 18:
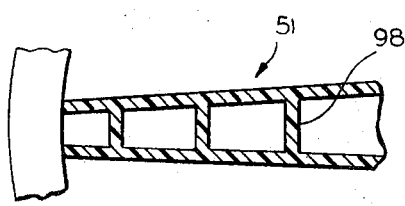
Figure 17:
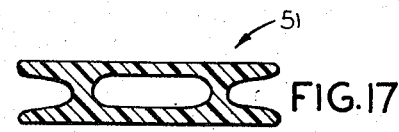
Figure 19:
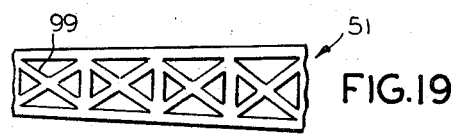

FIG. 17 is an oval cross-section of the spoke of FIG. 7 at the approximate point where the spoke joins the wheel rim. FIG. 18 is a cross-section of the spoke of FIG. 8 showing internal support 98. In FIG. 19, a cross-section of one form of internal truss work 99 is shown as integrally formed into the spoke member 51.

The various figures have shown a number of principles which may be combined in any suitable manner to provide new and novel structures. Thus, for example, the spokes 51 could have the internal truss work of FIG. 19, which could be filled with foam. The rim 50 could have the honeycomb reinforcement of FIG. 10. The struts 85 could have the star shape of FIG. 15. Still other combinations and modifications could be made by those who are skilled in the art. Therefore, the appended claims are to be construed to cover all equivalent structures falling within the true spirit and scope of the invention.

I claim:

1. A vehicle wheel comprising a member having a wheel center with spokes extending radially therefrom to a circumferential rim, said rim being formed to provide a seat for a pneumatic tire, hub means in the wheel center shaped for receiving a sleeve, bearing, and axle assembly, wherein said wheel comprises two substantially mirror image dish-like members which are preformed with lateral wheel halves of said center, spokes and rim and are secured together in a face-to-face relationship, the edges of each of said dish-like members terminating between said spokes in flange areas perpendicularly dependent from said rim for adding strength and providing greater areas for securing the members together.

2. The wheel of claim 1 wherein said rim has a generally H-shaped cross-section, beads formed at the outer ends of said H-shaped cross-section for establishing cove members for receiving the beads of a tire.

3. The wheel of claim 1 wherein said spokes are hollow with reinforcing means therein.

4. The wheel of claim 3 wherein the wheel is plastic and the reinforcing means is a foam material.

5. The wheel of claim 1 wherein said wheel comprises rim, spoke and hub members, and strengthening means extending between at least some members of said wheel.

6. The wheel of claim 5 wherein said strengthening means comprises fillets between said wheel members.

7. The wheel of claim 5 wherein said strengthening means are struts extending between said wheel members.

8. A vehicle wheel comprising a member having a wheel center and spokes extending radially therefrom to a circumferential rim, said rim being formed to provide a seat for a pneumatic tire, said rim having a generally H-shaped cross-section, beads formed at the outer ends of said H-shaped cross-section for establishing cove members for receiving the beads of a tire, and the inner ends of said H-shaped cross-section receiving strengthening and reinforcing material.

9. The wheel of claim 8 wherein the reinforcing means is an internal truss structure.

10. A vehicle wheel comprising two integral members, each having a wheel center with spokes extending radially therefrom to a circumferential rim seat for a pneumatic tire, said wheel center being shaped for providing a pair of spaced parallel seats for receiving wheel bearings to support cones on an axle, each of said two members being dished, and secured together in a face-to-face relationship, the edges of each of said dished members terminating in flange areas for adding strength and providing greater areas for securing the two members together, the rim formed by said secured together dished members having generally H-shaped cross-section with beads formed at the outer ends of said H-shaped to establish opposed coves for receiving the beads of a pneumatic tire, the inner ends of said H-shaped cross-section embracing, strengthening and reinforcing material, said spokes being hollow with reinforcing material therein.

11. The wheel of claim 10 wherein the two integral members are constructed of plastic.

12. The wheel of claim 11 wherein the reinforcing material is a foam or honeycomb material.

13. The wheel of claim 10 wherein the reinforcing means is an internal truss structure.

* * * * *

UNITED STATES PATENT OFFICE
CERTIFICATE OF CORRECTION

Patent No. 3,862,779     Dated January 28, 1975

Inventor(s) WILLIAM WEIR JAYNE

It is certified that error appears in the above-identified patent and that said Letters Patent are hereby corrected as shown below:

Column 1, line 14, "tightening the loosening" should be --tightening and loosening--

Column 2, line 39, "ecnter" should be --center--

Column 6, line 13, after "having" should be --a--

Signed and sealed this 20th day of May 1975.

(SEAL)
Attest:

RUTH C. MASON
Attesting Officer

C. MARSHALL DANN
Commissioner of Patents
and Trademarks